(No Model.) 8 Sheets—Sheet 1.

S. H. BARTON.
MEANS FOR RAISING OR LOWERING DENTAL CHAIRS.

No. 579,785. Patented Mar. 30, 1897.

WITNESSES:
Baltus DeLong.
Samuel W. Sims

INVENTOR:
S. H. Barton
By Atty (No Model.) 8 Sheets—Sheet 2.

S. H. BARTON.
MEANS FOR RAISING OR LOWERING DENTAL CHAIRS.

No. 579,785. Patented Mar. 30, 1897.

WITNESSES: INVENTOR:

(No Model.) 8 Sheets—Sheet 3.

S. H. BARTON.
MEANS FOR RAISING OR LOWERING DENTAL CHAIRS.

No. 579,785. Patented Mar. 30, 1897.

WITNESSES: INVENTOR:

(No Model.) 8 Sheets—Sheet 4.
S. H. BARTON.
MEANS FOR RAISING OR LOWERING DENTAL CHAIRS.
No. 579,785. Patented Mar. 30, 1897.
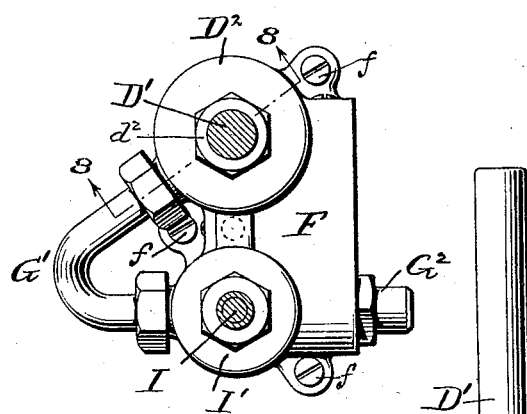
FIG. 6.
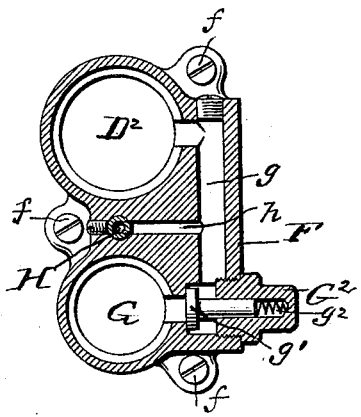
FIG. 7.
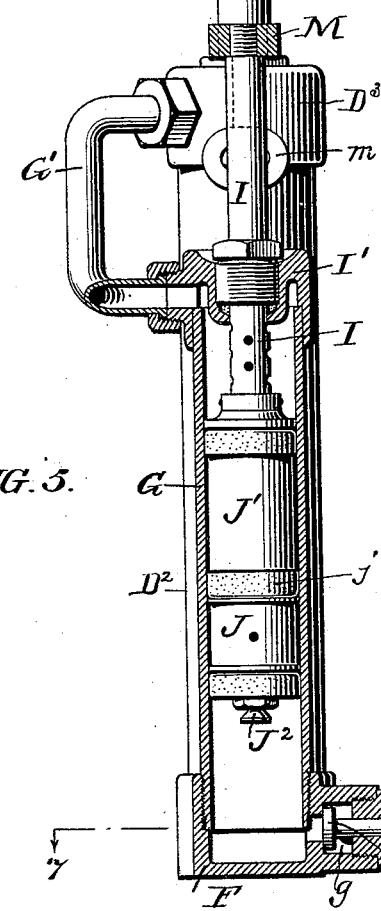
FIG. 5.
FIG. 8.
WITNESSES: INVENTOR:

(No Model.) 8 Sheets—Sheet 5.

S. H. BARTON.
MEANS FOR RAISING OR LOWERING DENTAL CHAIRS.

No. 579,785. Patented Mar. 30, 1897.

WITNESSES: INVENTOR:

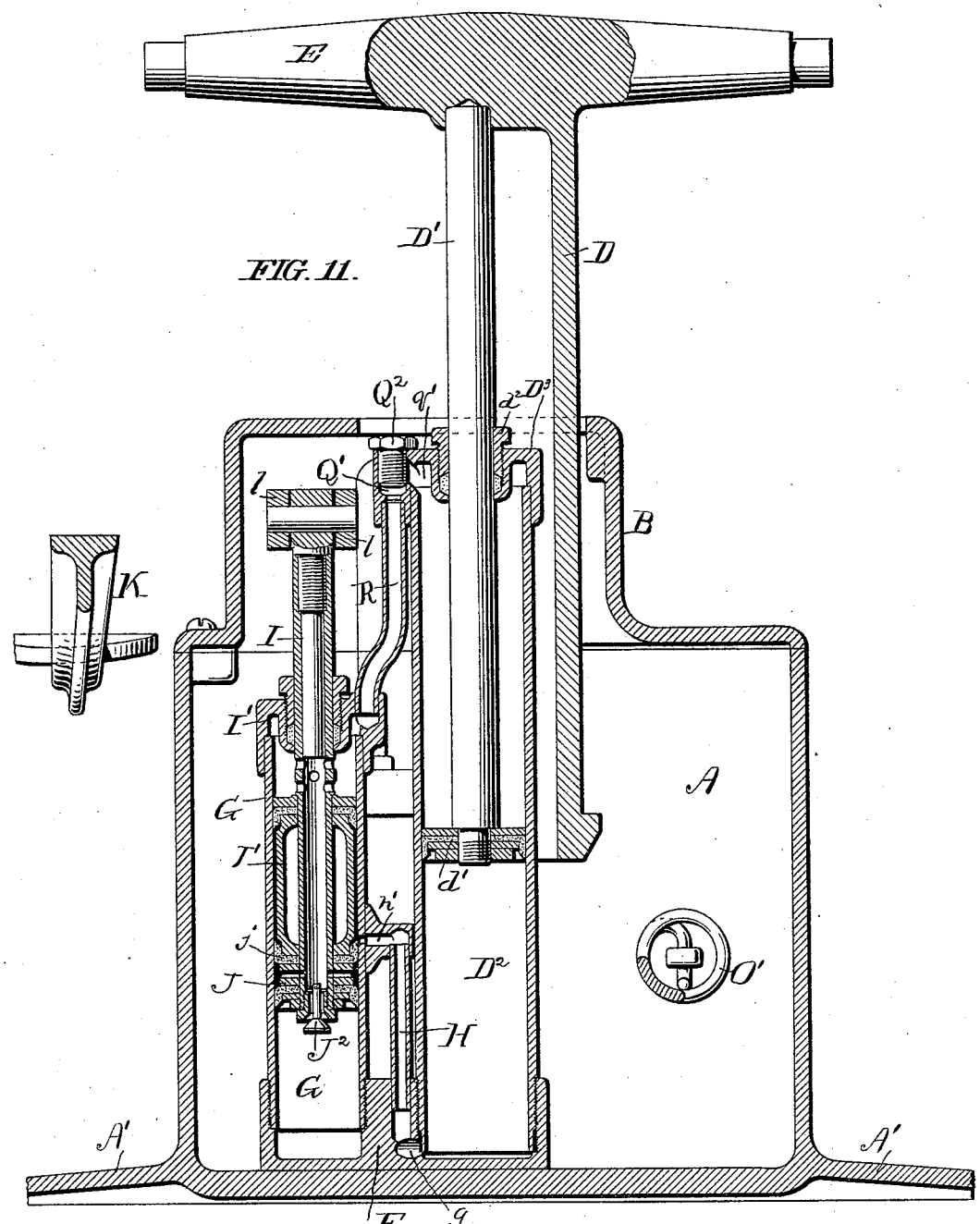

(No Model.) 8 Sheets—Sheet 7.

S. H. BARTON.
MEANS FOR RAISING OR LOWERING DENTAL CHAIRS.

No. 579,785. Patented Mar. 30, 1897.

WITNESSES: INVENTOR:

(No Model.) 8 Sheets—Sheet 8.

S. H. BARTON.
MEANS FOR RAISING OR LOWERING DENTAL CHAIRS.

No. 579,785. Patented Mar. 30, 1897.

WITNESSES:

INVENTOR:

UNITED STATES PATENT OFFICE.

SAMUEL H. BARTON, OF PRINCE'S BAY, NEW YORK, ASSIGNOR TO THE S. S. WHITE DENTAL MANUFACTURING COMPANY, OF PHILADELPHIA, PENNSYLVANIA.

MEANS FOR RAISING OR LOWERING DENTAL CHAIRS.

SPECIFICATION forming part of Letters Patent No. 579,785, dated March 30, 1897.

Application filed July 20, 1896. Serial No. 599,876. (No model.)

*To all whom it may concern:*

Be it known that I, SAMUEL H. BARTON, a citizen of the United States, residing at Prince's Bay, in the county of Richmond and State of New York, have invented certain new and useful Improvements in Means for Raising or Lowering Dental Chairs; and I do hereby declare the following to be a full, clear, and exact description of the invention, such as will enable others skilled in the art to which it appertains to make and use the same.

My invention relates to certain improvements, as hereinafter claimed, in hydraulic raising and lowering mechanism applicable to dental chairs.

Figure 1:
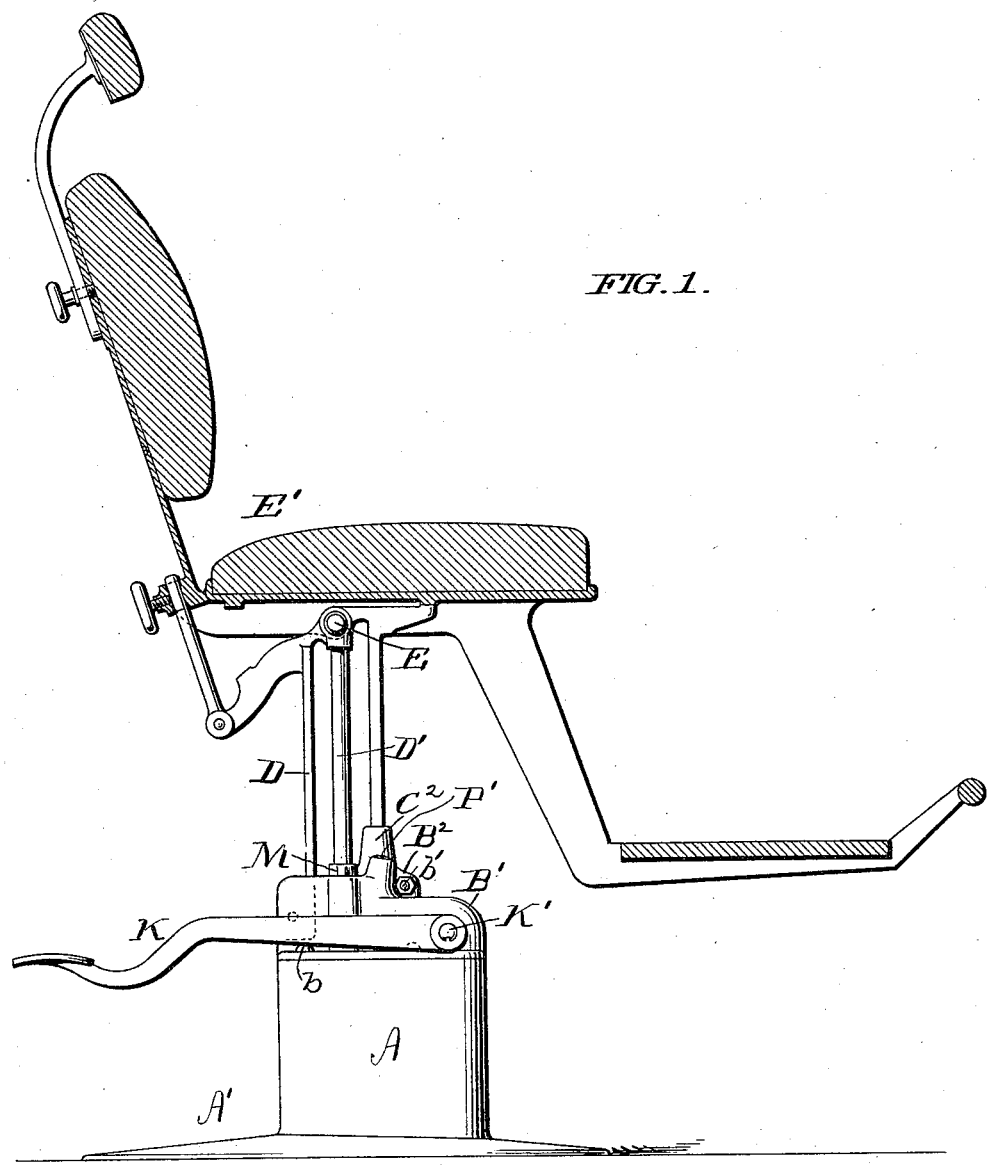
Figure 2:
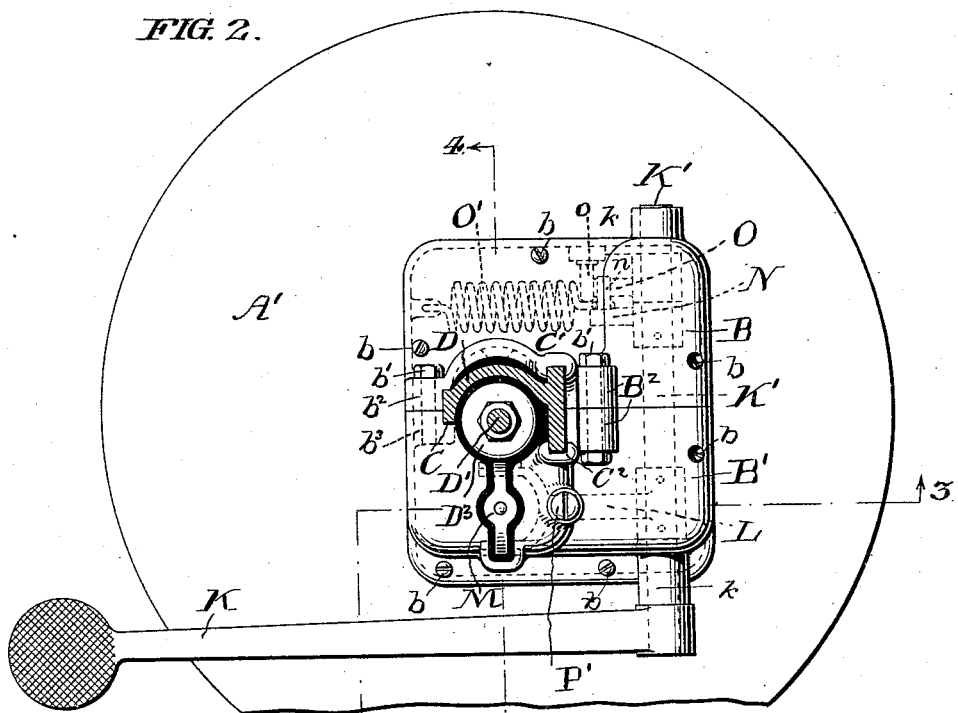
Figure 3:
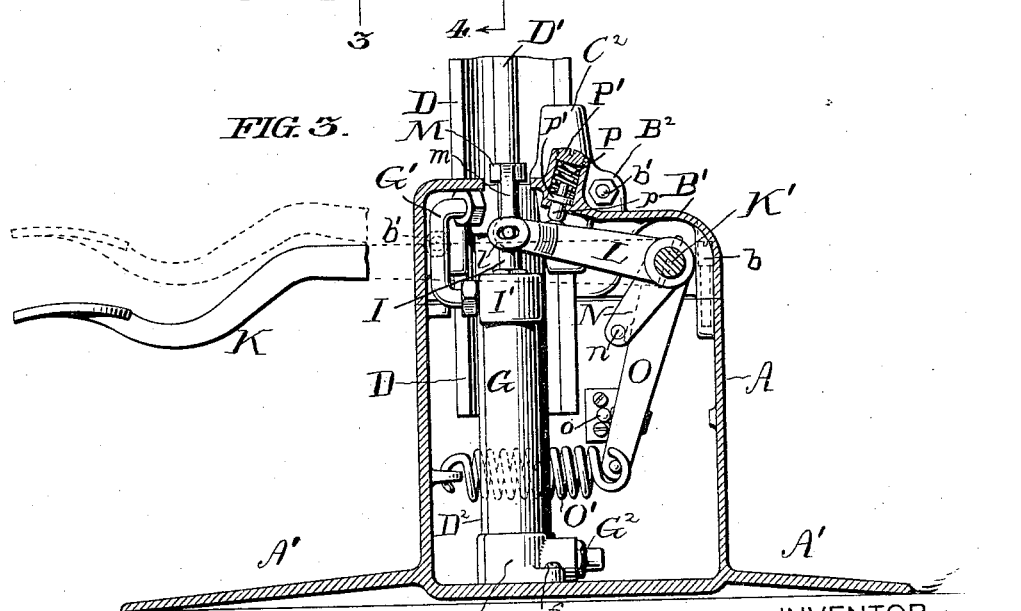
Figure 4:
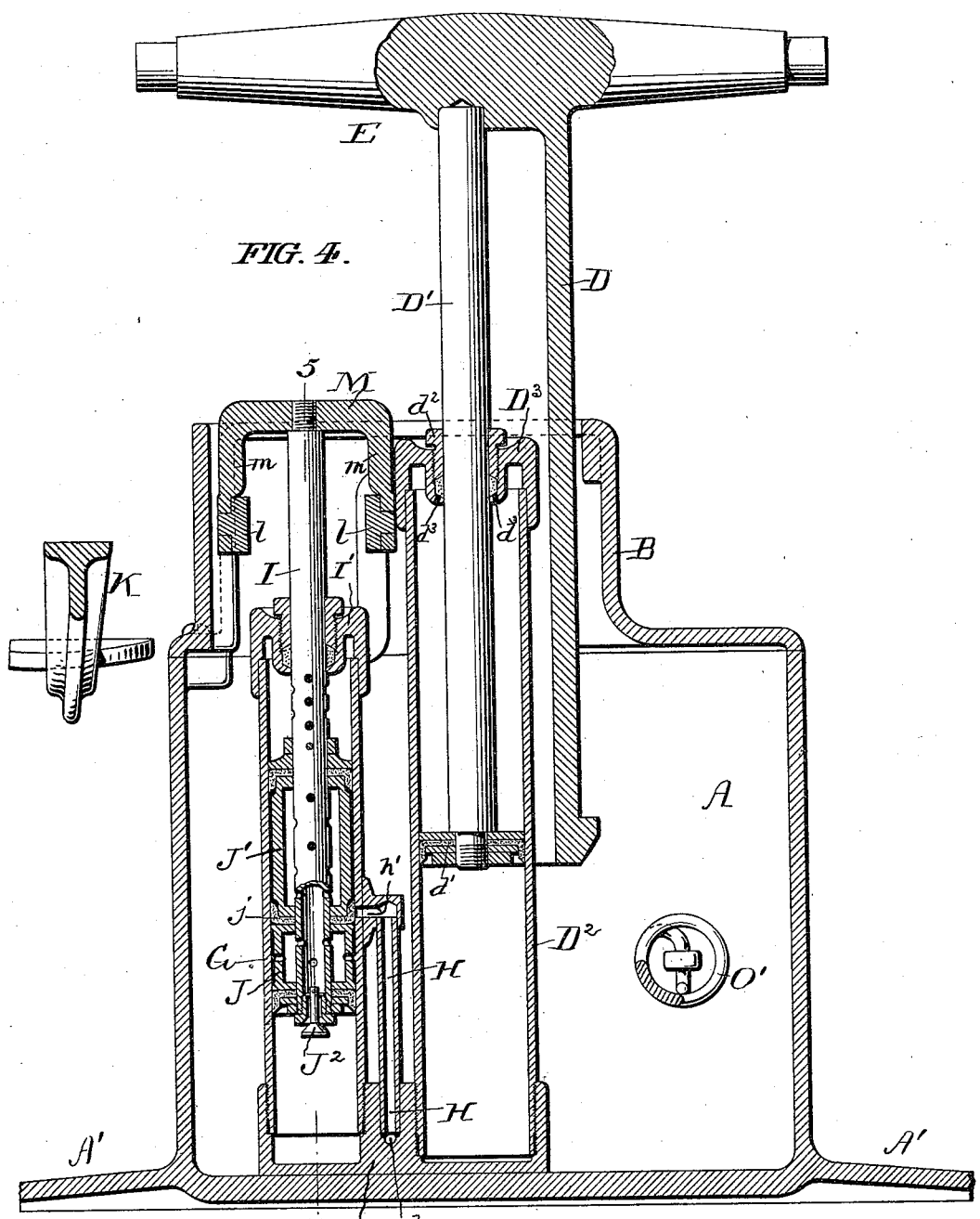
Figure 9:
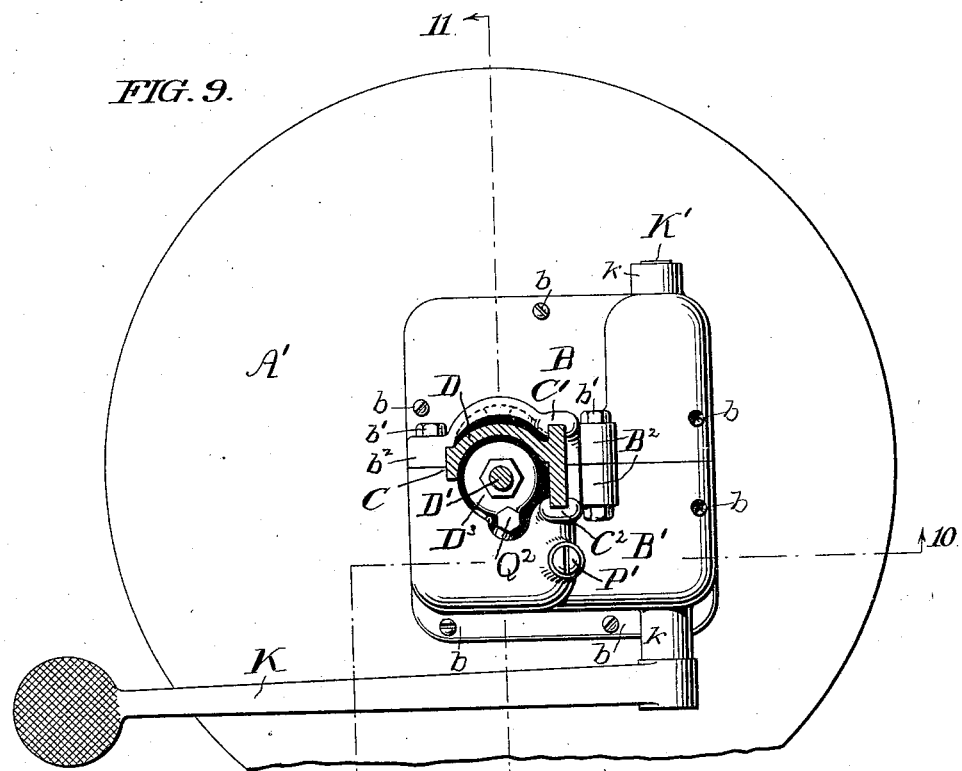
Figure 10:
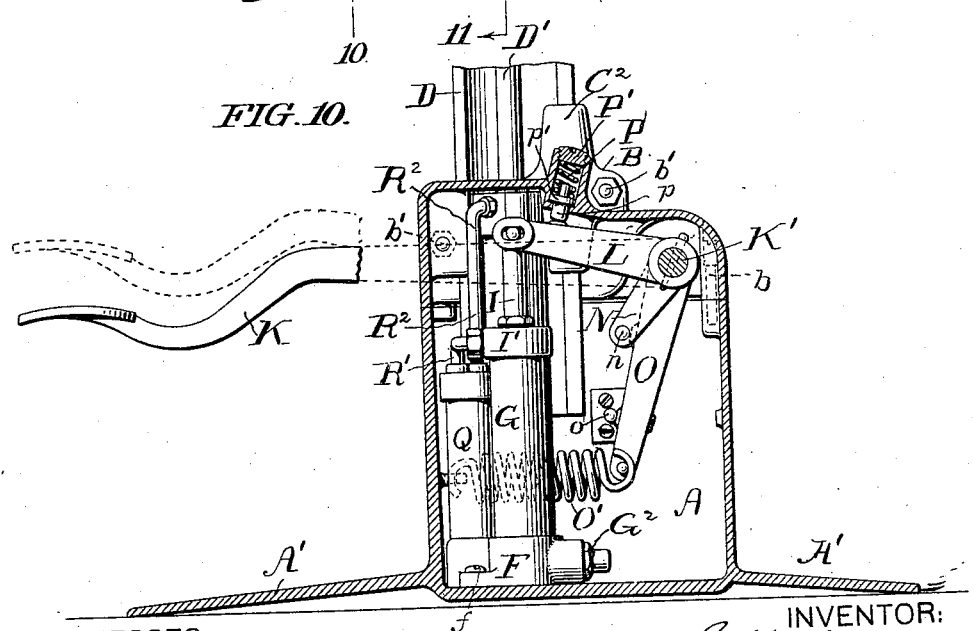
Figure 13:
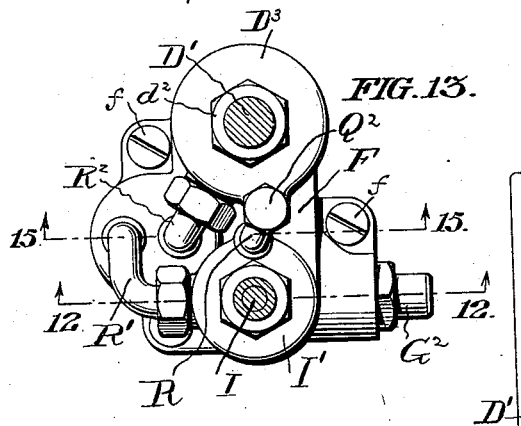
Figure 14:
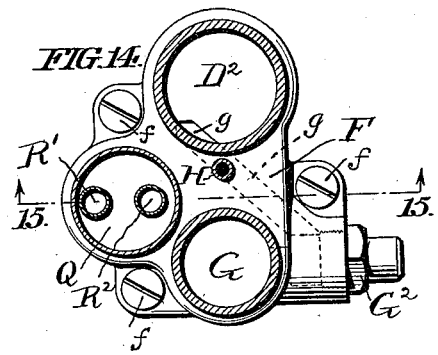
Figures 12, 15:
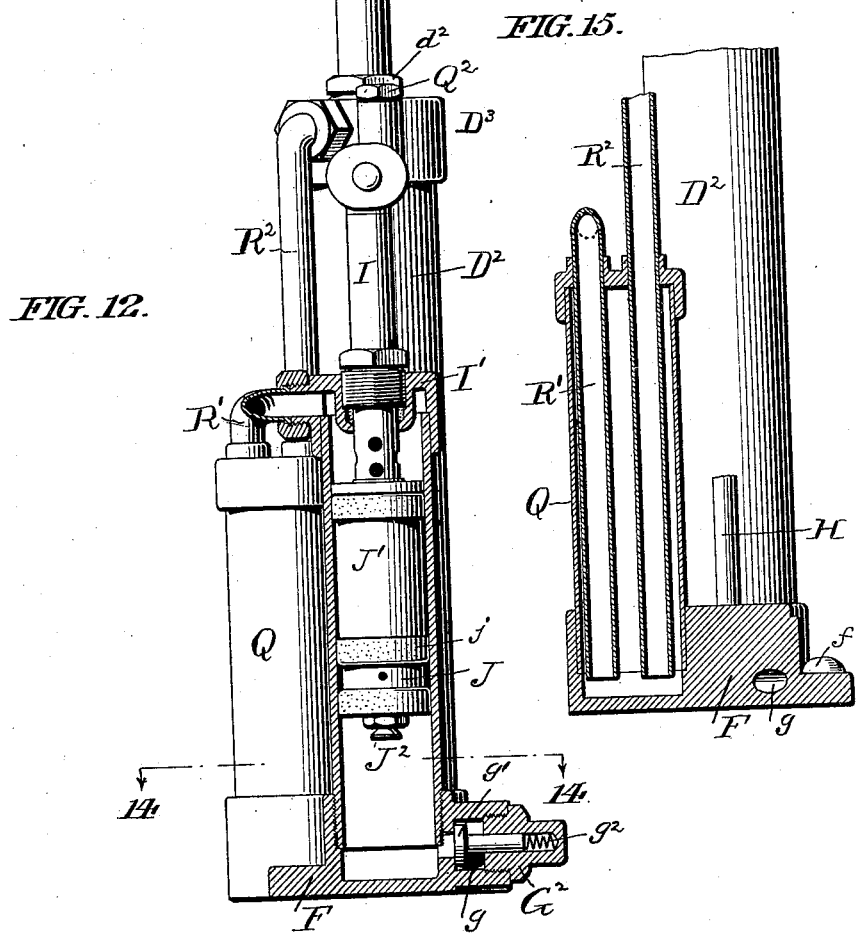
Figure 18:
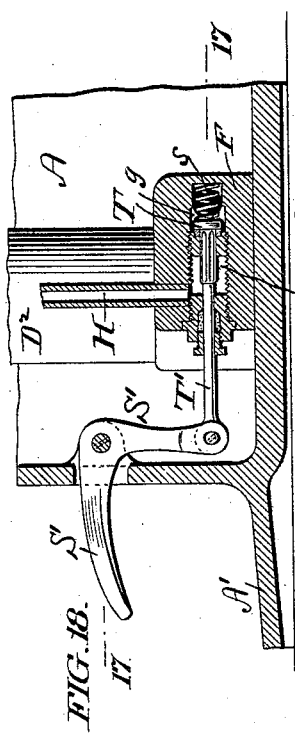
Figure 17:
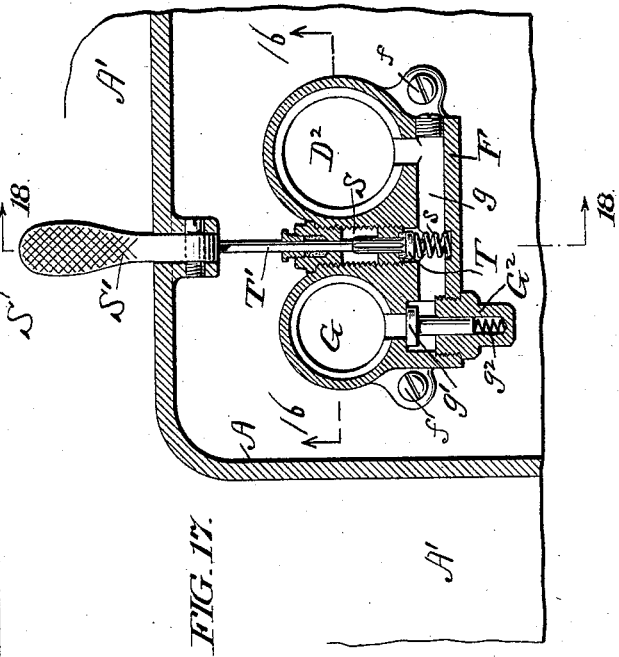
Figure 16:
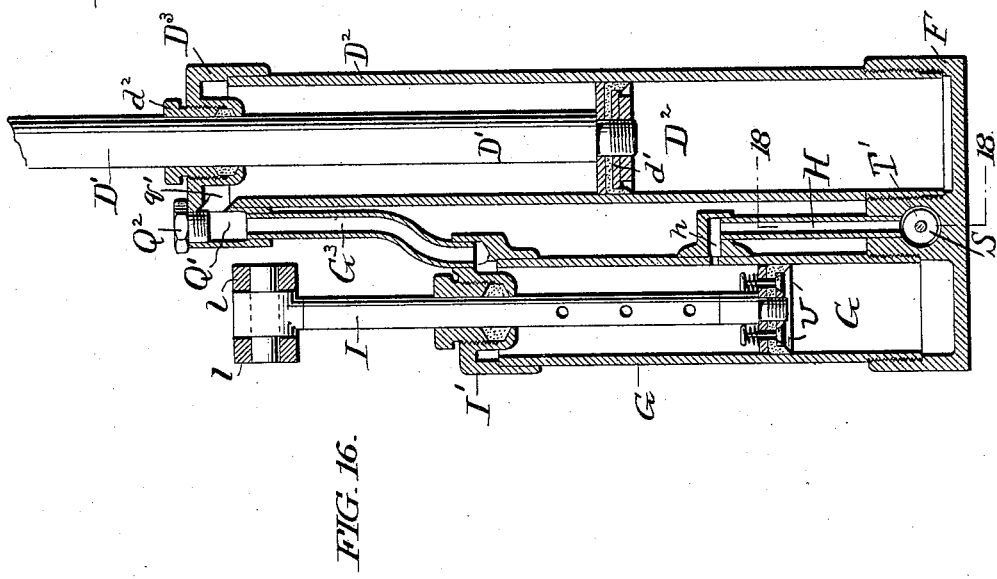

In the accompanying drawings, which represent a suitable embodiment of my improvements with modifications thereof, Figure 1 shows the chair with parts in vertical section and other parts in side elevation. Fig. 2 is a view on a larger scale, showing a plan of some parts with the support for the chair-frame and the plunger for raising and lowering it in horizontal section; Fig. 3, a view partly in side elevation and partly in vertical section on the line 3 of Fig. 2; Fig. 4, a view in vertical section on the line 4 of Fig. 2 on a larger scale than that of the preceding views; Fig. 5, a view partly in side elevation and partly in vertical section on the line 5 of Fig. 4; Fig. 6, a plan view showing parts represented in Fig. 5 with the plunger and pump-piston rod in section; Fig. 7, a horizontal section on the line 7 of Fig. 5; Fig. 8, a vertical section on the line 8 of Fig. 6. Figs. 9 to 15, inclusive, represent a modified construction. Fig. 9 is a view partly in plan and partly in horizontal section; Fig. 10, a view partly in side elevation and partly in vertical section on the line 10 of Fig. 9; Fig. 11, a view in vertical section on the line 11 of Fig. 9; Fig. 12, a view partly in side elevation and partly in vertical section on the line 12 of Fig. 13; Fig. 13, a plan view of parts shown in Fig. 12 with the plunger and pump-piston rod in section; Fig. 14, a view partly in plan and partly in horizontal section on the line 14 of Fig. 12; Fig. 15, a view partly in elevation and partly in section on the line 15 of Figs. 13 and 14. Figs. 16, 17, and 18 show a further modification. Of these views Fig. 16 is a view mainly in vertical section on the line 16 of Fig. 17; Fig. 17, a view mainly in horizontal section on the line 17 of Fig. 18, and Fig. 18 a view mainly in vertical section on the lines 18 of Figs. 16 and 17.

A hollow pedestal or base A, having a supporting-disk A', is provided with a hollow detachable cap made in separable sections B B', secured upon the pedestal by means of a number of screws $b$, passing through the cap-sections and engaging lugs on the inside of the pedestal, as will readily be understood. The two sections of the cap are strongly detachably connected with each other by means of bolts $b'$ $b'$ and nuts, one bolt passing through the lugs $B^2$ $B^2$ on the outside of the sections and the other passing through the outside lug $b^2$ on the cap-section B and the inside lug $b^3$ on the cap-section B'. The sectional pedestal-cap is provided with guideways C C' $C^2$, in which a raising and lowering support D is adapted to be vertically adjusted. This support partially surrounds a plunger D' and its cylinder $D^2$, which constitute parts of suitable mechanism for raising and lowering the support. The support D terminates at top in the cross-arm journal or trunnions E, against which the plunger D' bears and upon which is mounted a chair-frame E', so as to be capable of tilting.

The above-described sectional pedestal-cap provided with guideways, the support adjustable up and down in said guideways, the raising and lowering plunger, and the manner of supporting the chair-frame are the same, or substantially the same, as shown in the dental-chair application of Arthur W. Browne, filed April 15, 1896, Serial No. 587,693. I make no claim to any features shown in said application.

The imperforate or valveless plunger-piston $d'$ is suitably packed and works fluid-tight in its cylinder, and the plunger also works fluid-tight in a suitable stuffing-box $D^3$ at the top of its cylinder. This cylinder is firmly and detachably secured in place in the pedestal by being screwed into a socket in a frame F within the pedestal and attached to the bottom thereof by screws $f$. A pump-cylinder G is mounted in the pedestal by the side of the plunger-cylinder, and like it is detachably secured in place by being screwed into a socket in the supporting-frame E. The two cylinders have constant communication at top by way of a tube G, and a valved passage-way $g$ adapts them to have communication at bottom. This passage-way $g$ is formed in the frame F, and the controlling-valve $g'$ thereof is adapted to open outwardly or away from the pump-cylinder. The stem of this valve projects into a plug $G^2$, screwed into the frame, and is acted upon by a spring $g^2$. A passage-way $h$ in the frame F communicates with the passage $g$ and with a tube H, extending upwardly by the side of the pump-cylinder and adapted to communicate with this cylinder by a lateral passage-way $h'$, registering with an opening in the side of the cylinder.

A tubular piston-rod I works through a stuffing-box I' at the top of the pump-cylinder and is suitably provided with perforations beneath the stuffing-box. The pump-piston is made in two parts or divisions, a lower part or piston proper, J, and an upper part J'. The upper and lower extremities of the piston are suitably packed, so as to work fluid-tight in the cylinder, and the joint between the two sections of the piston is likewise suitably packed. An outwardly-opening valve $J^2$ is provided at the lower end of the tubular piston.

A foot-actuated lever K is suitably attached to a rock-shaft K', mounted in bearings $k$ $k$ on the two sections of the pedestal-cap. The rock-shaft extends through the pedestal-cap. A lever L is fastened at one end to the rock-shaft within the pedestal-cap, is forked at its opposite end, and has loose pivotal connection by its forks $l$ $l$ with down-hangers $m$ $m$ of a cross-head M, secured to the upper end of the pump-piston rod. In this way depression of the actuating-lever by bearing on its foot-rest results in downward movement of the pump-piston. An arm N, fast on the lever rock-shaft, is provided at its outer end with a lateral pin or stud $n$, which projects crosswise of the path of movement of an arm O, loosely mounted by its upper end on the rock-shaft and acted upon by a pull-string O' at its lower end. The movement which may be imparted to the loosely-mounted arm by its spring is limited by a stop, shown as composed of a pin $o$, secured to the pedestal side.

It will be seen that the spring-actuated loosely-mounted arm acts on the rock-shaft through the medium of the arm N to turn it, so as to elevate the actuating-lever and impart an upstroke to the pump-piston after it has been given a downstroke by depression of the lever and the lever relieved from pressure of the foot. It will be understood that the spring O' and its coöperating devices can elevate the pump-piston only to a certain point determined by the stop $o$, which limits the movement imparted to the arm O by its spring. The pump-piston may be abnormally elevated for permitting gradual descent of the raising and lowering plunger, as farther on to be explained. This elevation of the piston above its normal uppermost position is shown as accomplished by slightly elevating the outer end of the foot-lever above its normal or usual position of elevation. It will be understood that this abnormal elevation of the actuating-lever is not interfered with by the spring-actuated arm O, as the arm N is perfectly free to rock with its rock-shaft in the direction for permitting upward movement of the lever L, which connects the pump-piston rod. The lever L is acted upon by a spring P to insure its return to its normal position after having been elevated to its abnormal position and released. This spring P is housed in a cavity in the cap of the pedestal and bears at one end on a push-plug $p$, which presses on the upper surface of the lever L. A screw-plug P', bearing on the upper end of the spring, serves to regulate its tension. The collar or shoulder $p'$ of the push-plug limits its movement by the pressure of the spring and relieves the arm L of spring-pressure at the time the actuating-lever is occupying its normal position. In this way possibility of interfering action of the springs O' and P is avoided.

The plunger-cylinder and the pump-cylinder and its piston and piston-rod contain suitable liquid, as oil, with which these parts may be supplied by way of the stuffing-box $D^3$ for the plunger, the gland $d^2$ and packing being removed and the oil poured in through one or more openings $d^3$ in the bottom of the stuffing-box while the plunger-piston is at or near the bottom of the cylinder. Oil overflowing from the plunger-cylinder to the pump-cylinder by way of the connecting-pipe G' supplies the pump-cylinder and piston-rod and piston, as will readily be understood. The packing and gland having been properly adjusted to the plunger stuffing-box it will be seen that the oil is tightly confined, so as to prevent its leakage and protect it from dust, &c. Moreover, the oil may be supplied by the manufacturer or dealer and transported in position ready for use.

In operation upon each actuation of the lever for elevating the plunger and support oil is forced from the pump-cylinder to the plunger-cylinder beneath the plunger-piston by way of passage $g$. The valve in this passage opens to allow oil to pass to the plunger-cylinder and closes against its return upon the upstroke of the pump-piston. Oil above the plunger-piston in its cylinder overflows by the pipe-passage G' to the pump-cylinder in quantity corresponding to that displaced by the downward stroke of the pump-piston, and oil in quantity so supplied to the pump-cylinder passes downward by way of the piston-rod to the lower part of the pump-cylinder as the piston is elevated. It will be seen that during the shifting or circulation of the oil the parts designed to contain it accommodate it at all times. Repeated operations of the lever serve to elevate the plunger to the extent desired. To gradually lower the plunger and chair-frame support, the pump-piston is abnormally elevated by raising the outer end of the actuating-lever slightly above its normal position of elevation, thus elevating the intermediate packing $j$ of the pump-piston above the passage $h'$ and allowing oil to pass by way of this passage to the chamber or recess between the piston-section J and cylinder and thence into the perforated tubular piston and to the piston-rod and cylinder. The oil thus passing to the pump apparatus is forced from beneath the plunger-piston and passes by way of the passages $g$, $h$, and H to the passage $h'$, as will readily be understood. As soon as the actuating-lever is released the slight downward movement of the pump-piston shuts off communication between the pump-cylinder and the plunger-cylinder by way of the passage $h'$.

In accordance with the modified construction shown in Figs. 9 to 15 an auxiliary reservoir or third cylinder Q is provided, and the communicating connection between the upper ends of the plunger-cylinder and pump-cylinder for passage of oil back and forth from one to the other instead of being direct by way of the pipe G', as before, is by way of the auxiliary cylinder. The oil instead of being supplied by way of the stuffing-box of the plunger-cylinder, as before described, is poured in at an inlet Q', provided with a screw-plug Q² for tightly closing it, and passes to the plunger-cylinder at the opening $q'$ thereto, Fig. 11, and to the pump-cylinder by the pipe R. The oil supplied, having filled the pump-cylinder, begins to flow to the auxiliary cylinder or reservoir by the communicating pipe R', connecting it directly with the pump-cylinder. Another communicating pipe R² connects the auxiliary reservoir with the plunger-cylinder at top. The pipes R' R² extend through the top of the closed auxiliary cylinder down to near its bottom. As the oil passes to and rises in the auxiliary cylinder the air in this cylinder is compressed above the oil, and obviously the time at which this compression of the air to the maximum extent by the pressure of oil admitted to the cylinder is reached is indicated by the rise of the oil to about the level of the inlet Q', at which time the plunger-cylinder has been properly supplied. The plug Q² is then to be secured in place, any slight overcharge of oil having been removed when necessary to admit the plug to its place. The actuating-lever, its rock-shaft, and attachments are the same as before except that the connection between the lever L and pump-piston rod is a direct loose pivotal connection, dispensing with the cross-head having down-hangers. The passage $g$ of the communication between the bottoms of the pump and plunger-cylinders is arranged at an inclination to that before described.

Other features shown are either identically or substantially the same as already described, the frame F being slightly modified to provide for securing the auxiliary cylinder in place in a socket therein.

The operation of the modified mechanism will readily be understood.

It will be seen that the provision of the auxiliary cylinder enables me to employ a pump-cylinder of less oil capacity than would be required to impart a given range of movement to the plunger were the auxiliary cylinder not used, and it is obvious that by increasing the capacity of the auxiliary cylinder the oil capacity of the plunger-cylinder could be increased and the range of movement of the plunger lengthened without necessitating any increase in the oil capacity of the pump-cylinder.

Figs. 16, 17, and 18 show a modification in which instead of an abnormal upward movement being given the actuating-lever to allow of descent of the plunger and support valve-tripping mechanism independently of the actuating-lever is employed to open communication between the plunger-cylinder beneath the plunger and the pump-cylinder above its valved piston. The plunger-cylinder and the pump-cylinder are shown as having communication at top by way of a pipe G³, which also serves as a means for supplying oil to the cylinders, as will be understood, and at bottom by the passage-way $g$, which has communication by the pipe H with the pump-cylinder, as before. The passage $h$ opens into the pump-cylinder, however, at a point above the highest position to which the pump-piston is ever raised. An ordinary properly-packed piston is provided for the pump-cylinder instead of the two-part peculiarly-constructed piston before shown. A suitable valve and tripping-lever for controlling the descent of the plunger by allowing escape of oil from its cylinder to the pump-cylinder by way of pipe H are provided, as follows: The pipe H terminates at its lower end in a chamber S, to which oil may be omitted from the passage $g$ by opening a valve T by the operation of tripping-lever S', suitably pivoted to the pedestal and adapted to thrust the valve rod or stem T' inward to unseat it. A spring $s$ acts to normally hold the valve closed and the lever S' in its inoperative position. The operation of this modified construction will readily be understood, and it will be seen that all mechanism within the pedestal designed for coöperation with the actuating-lever when adapted to have an abnormal upward movement is dispensed with.

The last-described modification shows the pump-piston rod as solid at its lower end and the piston as suitably valved directly instead of by way of its rod, so that by the closing of the valves U U upon the downstroke of the piston the piston is adapted to perform its function of forcing oil beneath the plunger-piston, while upon upward movement of the pump-piston its valves open to allow oil to flow to the pump-cylinder beneath the piston.

It will be seen that it is absolutely necessary in lowering the plunger that the oil escaping from beneath it shall pass to the pump-cylinder above the lower end or valved portion of the pump-piston and that it is immaterial, so far as the result to be accomplished is concerned, whether the pump-piston be directly provided with one or more valves, as in Fig. 16, or be valved by way of its hollow piston, as in the other constructions represented. It will be seen that the controlling-valve and tripping devices of Figs. 16, 17, and 18 perform the function accomplished by way of the two-part pump-piston when abnormally elevated—that is, serve as means by which communication is opened between the lower part of the plunger-cylinder and the pump-cylinder above its piston valve or valves for permitting gradual descent of the plunger by flow of oil from its cylinder to the pump-cylinder.

I claim as my invention—

1. The combination of the liquid-containing plunger-cylinder, means for supporting it, the plunger having the imperforate or valveless piston working fluid-tight in the cylinder, the liquid-containing pump-cylinder mounted by the side of the plunger-cylinder, the pump-piston valved to allow liquid in the pump-cylinder above the piston to pass down through the piston, means for actuating the pump-piston, a constantly-open communicating way between the cylinders above their pistons, a communicating way between the lower ends of the cylinders provided with a valve-opening to allow of the flow of liquid from the pump-cylinder to the plunger-cylinder and closing against return thereof, and means by which liquid beneath the plunger may be allowed to pass from the plunger-cylinder to the pump-cylinder above the valve of the pump-piston, substantially as and for the purpose set forth.

2. The combination of the liquid-containing plunger-cylinder, means for supporting it, the plunger having the imperforate or valveless piston working liquid-tight in the cylinder, the liquid-containing pump-cylinder mounted by the side of the plunger-cylinder, the pump-piston valved to allow liquid in the pump-cylinder above the piston to pass down through the piston, the lever for actuating the pump-piston, a constantly-open communicating way between the cylinders above their pistons, a communicating way between the lower ends of the cylinders provided with a valve-opening to allow of the flow of liquid from the pump-cylinder to the plunger-cylinder and closing against return thereof, and means brought into operation by abnormal elevation of the actuating-lever by which liquid may be allowed to pass from the plunger-cylinder beneath the plunger to the pump-cylinder above the valve of its piston, substantially as and for the purpose set forth.

3. The combination of the liquid-containing plunger-cylinder, the plunger having the imperforate or valveless piston working liquid-tight in the cylinder, the liquid-containing pump-cylinder at the side of the plunger-cylinder, the perforated tubular pump-piston rod, the recessed, perforated, tubular pump-piston valved to allow liquid in the pump-cylinder above the piston to pass down through the piston, the lever for actuating the pump-piston, a constantly open communicating way between the cylinders above their pistons, a communicating way between the lower ends of the cylinders provided with a valve which opens to allow of the flow of liquid from the pump-cylinder to the plunger-cylinder and closes against return thereof, the rock-shaft of the actuating-lever, the rock-shaft lever having connection with the pump-piston rod, the arm loosely mounted on the rock-shaft, the spring acting on this arm, the arm fast on the rock-shaft and operated upon by the spring-actuated loosely-mounted arm to raise the actuating-lever to its normal position of elevation and then leave it free to be abnormally elevated, and a liquid-passage by which, upon abnormal elevation of the actuating-lever, communication is opened for the flow of liquid from beneath the plunger-piston to the pump-cylinder, substantially as and for the purpose set forth.

4. The combination of the pedestal or base, the liquid-containing plunger-cylinder, the plunger having the piston working liquid-tight in the cylinder, the liquid-containing pump-cylinder, its valved piston, means for actuating the piston, the liquid-containing auxiliary cylinder, means by which the plunger-cylinder and the pump-cylinder have a constantly open communication above their pistons by way of the auxiliary cylinder, a communicating way between the lower ends of the plunger-cylinder and pump-cylinder provided with a valve-opening to allow of the flow of liquid from the pump-cylinder to the plunger-cylinder and closing against return thereof, and means by which liquid may be allowed to pass from the plunger-cylinder beneath the plunger to the pump-cylinder above the valve of its piston, substantially as and for the purpose set forth.

In testimony whereof I affix my signature in presence of two witnesses.

SAMUEL H. BARTON.

Witnesses:
SEYMOUR CASE,
A. W. BROWNE.